Patented Nov. 6, 1934

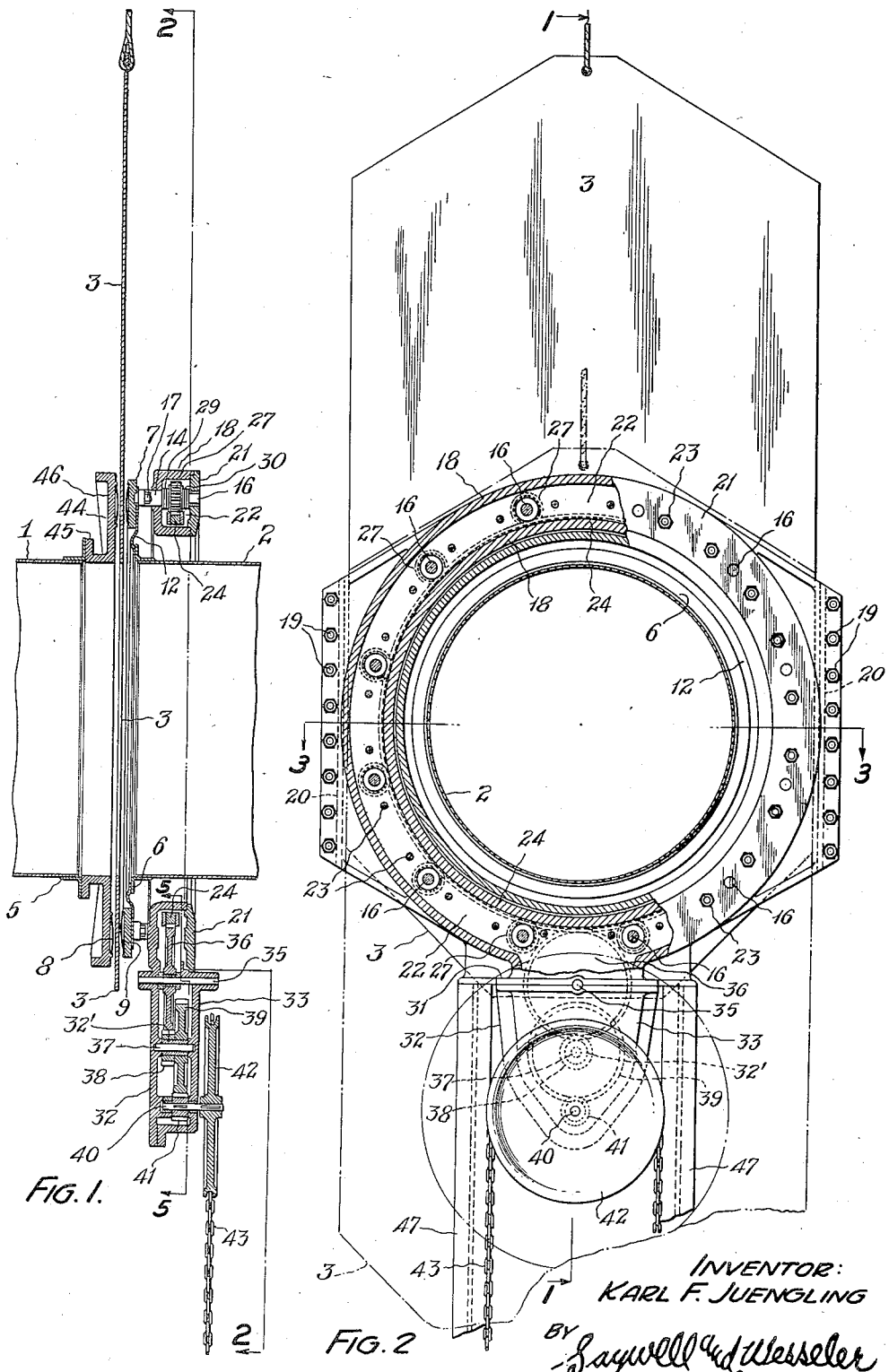

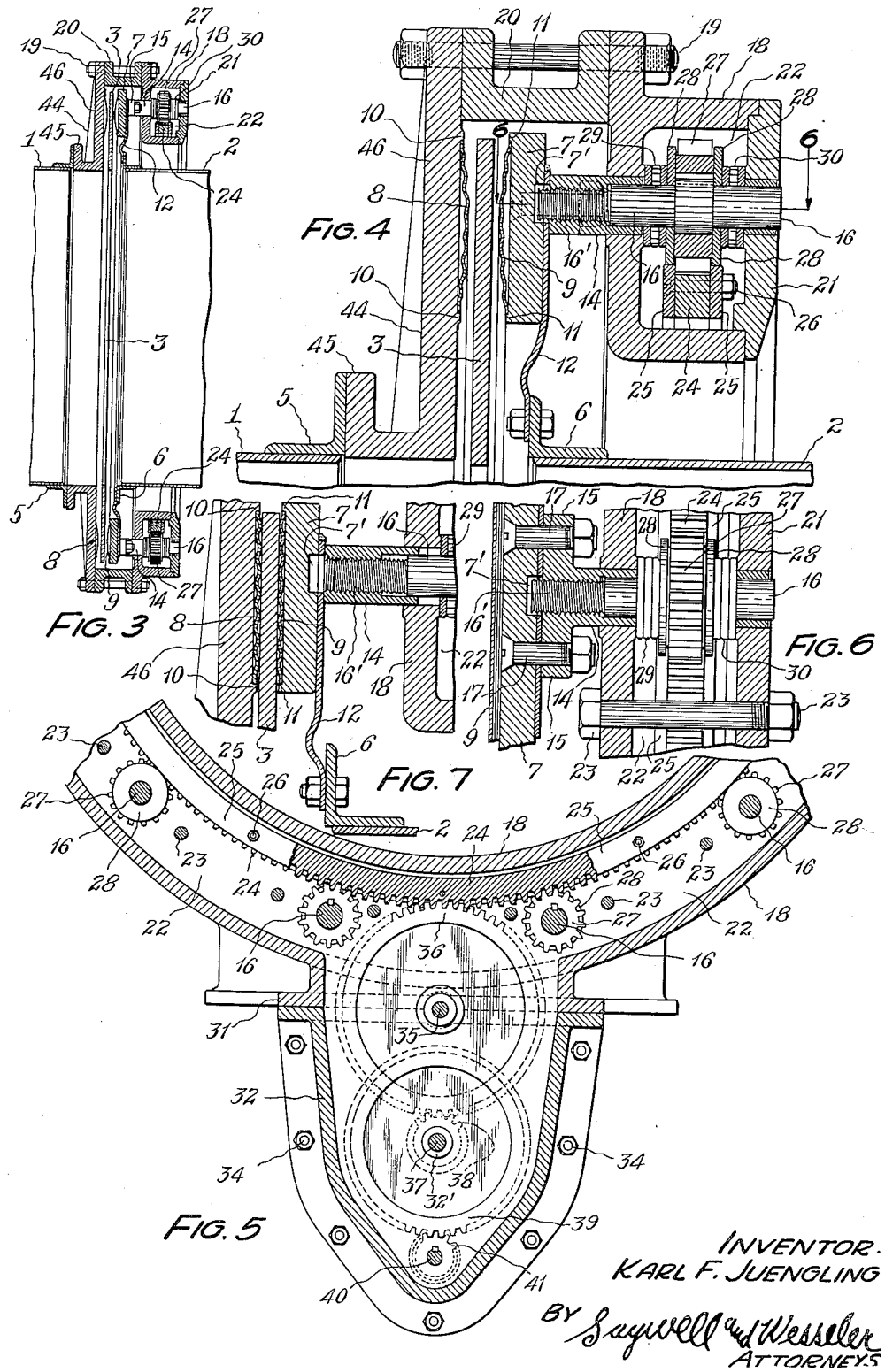

1,979,885

UNITED STATES PATENT OFFICE 1,979,885

HOT GAS GATE

Karl F. Juengling, Lakewood, Ohio

Application May 6, 1931, Serial No. 535,531

9 Claims. (Cl. 251—167)

The invention particularly relates to improvements in a gate utilized for opening and closing a passage in a hot gas conduit in which the gases derived from gas producers, blast furnaces, and the like, are handled.

The objects of the invention are to produce a gate of this character which is of economical manufacture and easily controlled, which is durable, which insures a positive and accurate maintenance of the control plate upon its seat, and the operating mechanism for which is supported upon one of the seat members only and is disposed entirely exteriorly of and around the gas conduit and can be applied to the conduit-closing gate plate at a plurality of closely adjacent points so as to insure a symmetrical and balanced condition of the plate and its seats at all times without interfering with any of the connections rigidly uniting the gas conduit sections or rigidly uniting the conduit flanges upon which the seat operating mechanism is located. Still further objects of the invention are the production of a device which can be mounted in a relatively small transverse opening between the adjacent conduit ends and which will occupy a small space lengthwise of the conduit; a device which will not be affected by expansion or contraction of one or both of the conduit sections when the latter are used for conducting gases of varying temperature; a device in which one of the conduit sections can be tilted or moved axially relative to the other section without affecting the tightness of the seat elements with the gate plate; a device in which novel and positive mechanism is provided for causing the seats to engage and disengage the gate plate; a device in which the thrust for closing the seat is applied within the area of the seat so as to eliminate deflectional distortion and warping of the seat; and a device in which a relatively wide opening is provided between the opposed seats in their open position so as to permit ready access for the purpose of cleaning, inspection, etc., although the transverse slot between the conduit ends is comparatively small for devices of this character. Also, I provide a movable member which must be actuated to effect the sealing relation which is relatively light in weight and which, in fact, comprises in the embodiment shown and described practically only the seat element.

In the particular embodiment of the invention shown in the accompanying drawings and hereinafter described, there are no rigid connections between the two conduit sections, but only between a flange secured to one conduit section and a housing member supported by said flange and within which the operating mechanism is contained. This housing member forms a complete closure and efficiently protects the contained mechanism from dust and dirt.

The annexed drawings and the following description set forth in detail certain means embodying my invention, such means disclosing, however, but one of the various forms in which the principle of the invention may be applied.

In said annexed drawings:

Figure 1 is a vertical section of my improved hot gas gate, taken in the plane indicated by the line 1—1, Figure 2, which is axially of the gas conduit with which the improved gate is incorporated;

Figure 2 is a transverse vertical section, taken in the planes indicated by the line 2—2, Figure 1;

Figure 3 is a section taken at right angles to the plane of section of Figure 1, the plane being indicated by the line 3—3, Figure 2, and there being shown in this Figure 3 the improved gate proper and its operating mechanism in connection with the adjacent ends of the gas conduit sections;

Figure 4 is a fragmentary view of part of the elements shown in Figure 3, upon an enlarged scale;

Figure 5 is a fragmentary transverse vertical section, upon an enlarged scale, taken in the planes indicated by the line 5—5, Figure 1;

Figure 6 is a fragmentary section, taken in the plane indicated by the line 6—6, Figure 4; and Figure 7 is a fragmentary view of the elements shown in Figure 4, particularly illustrating the relative positions of certain operating members when the gate plate and its seats are in closed position, the showing of these elements in Figure 4 being when the plate and seats are in released position.

Referring particularly to the annexed drawings in which the same parts are indicated by the same several numbers in the different views, two sections of a gas conduit, designated 1 and 2, respectively, have their adjacent ends slightly spaced apart so as to provide a slot through which a gate plate 3 of the usual construction can be vertically reciprocated so as to permit passage of gas from one pipe section to another when the usual registering aperture of the plate 3 is in alignment with the open ends of the sections 1 and 2, and shut off said sections from the passage of gas therethrough when the imperforate portion of the plate 3 is interposed between the adjacent open ends of the sections 1 and 2.

Suitably secured to the exterior surface of the pipe section 1 and adjacent the open end thereof is an annular angle 5, there being suitably secured to the adjacent pipe section 2 another annular angle member 6. Integrally secured to the angle 5 is an annular channel 44 having laterally extending legs of which a short leg 45 is secured flush with the extending flange of the angle 5 and a long leg 46 is extended outwardly from the periphery of the slot between the pipe sections 1 and 2. The outer lateral surface of the leg 46 of the annular channel 44 is formed with annular shoulders 10, and an annular longitudinally-spaced member 7, hereinafter more fully described, is formed with opposed similar shoulders 11, there being secured to the leg 46 and the member 7 within these respective pairs of shoulders 10 and 11 a pair of opposed corrugated spring diaphragms 8 and 9 forming seats adapted to be pressed closely against the opposite sides of the gate plate 3. The annular member 7 is connected with the angle 6 by an annular flexible plate 12 whereby any relative movement of the ends of the pipe sections 1 or 2 can be compensated for without disturbing the perfect seating of the seats 8 and 9 against the gate plate 3.

The support and mounting for the annular member 7 comprises an annular series of hub members 14 mounted on pins 16 having threaded stems 16' engaging the hub members 14, these hubs 14 having ears 15 secured by bolts 17 to the member 7, the flexible plate 12 being clamped adjacent its outer peripheral edge between the ears 15 and the member 7 and being intersected by the threaded stems 16', the member 7 being formed with a plurality of recesses 7' for the reception of the ends of the stems 17 when the hubs 14 are retracted in the manner and for the purpose hereinafter fully described. An annular gear housing 18 having a chambered portion 22 is secured by bolts 19 and spacing members 20 to, and a fixed distance from, the leg 46 of the annular channel 44, this gear housing 18 having a cover plate 21 fastened by bolts 23. An annular gear 24 is held in side plates or shroud plates 25 by bolts 26, the gear 24 being within the annular housing 18 and being adapted to actuate pinions 27 which are also enclosed by the housing 18 and are keyed to the pins 16. These pinions 27 are disposed between rollers 28 mounted in the housing 18 upon the pins 16 and spaced from the inner side of the housing 18 and the face plate 21 by anti-friction thrust bearings 29 and 30, respectively. The rollers 28 engage the gear plates 25 and support the gear 24 and hold the latter in proper engagement with the pinions 27. The annular gear housing 18 is formed with an opening at its lower side terminating with a bottom flange 31 to which is bolted a depending housing 32 having a cover plate 33 secured by bolts 34. Mounted in the housing 32 is a shaft 35 upon which is rotatably mounted a gear 36 engaging the annular gear 24. Also mounted in said housing 32 is a shaft 37 upon which is rotatably mounted a bushing 32' upon which are fixed a gear 39 and a pinion 38, the latter meshing with the gear 36. To a third shaft 40 is secured a pinion 41, which meshes with the gear 39. The shaft 40 is extended out through the face plate 33 and secured to the projecting shaft end is a sprocket wheel 42 with which engages a chain 43 by means of which the sprocket wheel 42 can be operated. This operation through the chain of gearing described effects the rotation of the annular gear 24 and hence the inward and outward movement of the annular member 7 and the plate 3 to compress the seats 8 and 9 against the gate plate 3 or release said plate from said seats.

In addition to the advantages hereinbefore set forth as objects of the invention, I direct particular attention to the fact that the entire actuating mechanism of my improved hot gas gate is applied to one side only of the gate plate so that the movement-producing elements may be applied to any portion of the surface of the plate. The operating mechanism of my improved gate is so mounted as to substantially eliminate the passage of heat from the hot conduit to this mechanism by conduction.

The thrust of the pins 16 is applied directly within the area of the seats 8 and 9 and not indirectly and at remote points, thus securing the full effect of the thrust and avoiding distortion. This thrust is applied at a comparatively large number of closely spaced points. The construction and assembly of the elements shown and described permit this short direct application of the thrust at many closely spaced points. So effective is this application of the thrust that if a spacing of pins 16 is used which does not exceed approximately one and one-half inches between centers, the annular member 7 may be dispensed with and the hub members 14 caused to impinge directly on the flexible diaphragm 12.

It will be noted that my improved seat elements comprise yielding elements of relatively large area, adapted to maintain the seats in gas-tight relation with the gate plate even when subjected to minor distortions and irregularities. Certain portions of these seat elements move radially as the seats move into engagement with the gate plate, thus producing a wiping action of certain of the seat portions upon the surface of the plate during the sealing operation. The concentric corrugations of which the seat elements are comprised provide a plurality of lines of contact which successively are caused to engage the gate plate.

Although the corrugated formation of the seat members 8 and 9 provides an extremely safe means for closing the gas main absolutely tight under all circumstances, particularly when assisted by the flexible plate 12, and the positive closely-spaced ring of actuating pins 16, still it is evident that my improved construction provides means whereby any leakage of gas that might occur, when the gate is supposed to be shut, escapes into the atmosphere between the channel 44 and the housing 18, so that any workmen entering the gas main under the assumption that the gate is leak-proof would not be subjected to the dangers of asphyxiation or an explosion.

I have shown a special support 47 for my improved operating mechanism, but it is evident that such extra support is not necessary and this mechanism might be supported on the gas main.

I do not limit myself to rigidly securing the operating mechanism to that seat member 46 which is rigidly connected to a conduit section, but might rigidly connect this operating mechanism to the seat member which is flexibly connected with its conduit section. Furthermore, both seat members might be flexibly connected with the ends of their respective conduit sections so as to permit both sections to move axially and/or angularly with relation to their seats. The invention is not limited to the use of even one flexible connection between a seat and the conduit section to which it is attached, inasmuch as certain parts of the improvements, particularly those relating to the operating mechanism, might be embodied in a hot gas gate of this character in which both seat members are rigidly mounted on their respective conduit sections. In the latter event, one or more flexible joints would be provided in one or both of the conduit sections to provide the necessary axial and/or angular movements required to effect the satisfactory functioning of the seats.

Where the circumstances are such that it is desired to provide only for the escape of fluid from the conduit, the invention would lend itself to use with one open conduit end only, which conduit end would be controlled by a gate plate removed therefrom or shifted relative thereto for effecting the control.

What I claim is:

1. A hot gas gate for alined ends of coaxial conduits defining a transverse slot comprising means adaptable for attachment to the respective conduit ends and formed with longitudinally-spaced opposed seats, a plate adapted to be moved in the space between the seats, and means for moving the seats relative to each other to clamp against the plate, said last-mentioned means comprising a ring gear surrounding one of the conduits, means for rotating said ring gear, and means for transforming said rotation into thrust at right angles with the surface of said plate, the projected axis of said thrust intersecting said seats.

2. A hot gas gate for alined ends of coaxial conduits defining a transverse slot comprising opposed members forming the sides of the slot and being provided with seats, a plate adapted to be moved in the slot between the seats, a casing supported by one of said members externally of the conduits, and means for clamping the plate in sealing relation with the seats, said means comprising a plurality of shafts rotatably mounted in the casing and having threaded engagement with one of said members, the projected axes of said shafts intersecting said seats, a pinion mounted upon each of said shafts, a ring gear engaging the pinions, and means for actuating the ring gear.

3. A hot gas gate for the end of a conduit comprising an annular transverse seat member, an annular casing adapted for connection with the conduit and projecting beyond the open end thereof, a plate movable across the conduit end and interposed between the casing and the seat, and operating mechanism for forcing the plate against the seat, said operating mechanism comprising a ring gear, a plurality of pinions operated thereby, a plurality of shafts actuated by said pinions toward and from the surface of the plate, the projected axes of said shafts intersecting said seat member, a plurality of rollers supporting the gear to hold it in engagement with the pinions, and means for actuating the gear, said operating mechanism being supported by the casing.

4. A hot gas gate for the end of a conduit comprising a transverse seat member, a casing adapted for connection with the conduit and projecting beyond the open end thereof, a plate movable across the conduit end and interposed between the casing and the seat, operating mechanism for forcing the plate against the seat, said operating mechanism comprising a plurality of elements mounted in the casing and operatively associated with said seat and each adapted to exert a rectilinear thrust at substantially right angles with the plane of the seat and within the projected area of the seat, and means for actuating all of said elements uniformly.

5. A hot gas gate for alined ends of coaxial conduits defining a transverse slot comprising unitary means adaptable for attachment to the conduit ends and formed with longitudinally-spaced annular seats, a plate adapted to be moved in the space between the seats, means for moving the seats and the plate into sealing relation, said means comprising an annular series of closely adjacent screw elements having their axes parallel with the axis of the conduits and being substantially equidistant from said axis, and means for simultaneously actuating said screw elements, the projected axes of said screw elements intersecting said seats, and said unitary means supporting said sealing elements around one conduit end.

6. A hot gas gate for the end of a conduit comprising a support having an annular transverse resilient seat member fixed at its edges, a plate movable across the conduit end, and also movable parallel with the conduit axis to deflect the seat member, said seat member being formed of thin metal and disposed convexly toward the plate, certain portions of the seat member being adapted to move in a radial direction when the plate is forced against the seat, thus effecting a wiping action by the seat upon the plate.

7. A hot gas gate for the end of a conduit comprising a support having an annular transverse resilient seat member fixed at its edges, a plate movable across the conduit end, and also movable parallel with the conduit axis to deflect the seat member, said seat member being formed with a plurality of concentric corrugations certain of which project farther from the conduit end than the others, whereby the plate engages the corrugations successively as it moves toward the seat.

8. A hot gas gate for the end of a conduit comprising an annular transverse member having an annular seat element fixed at its edges, said seat element being disposed as a whole concavely toward said transverse member and said seat element being formed of concentric corrugations, the tops of certain corrugations being spaced varying distances from the surface of said transverse member, a relatively flat plate movable across the conduit end, said plate being juxtaposed to said seat element, and means for moving the plate parallel with the conduit axis to cause it successively to engage the corrugations.

9. A hot gas gate for alined ends of coaxial conduits defining a transverse slot comprising unitary means adaptable for attachment to the conduit ends and formed with longitudinally-spaced opposed annular seats, a plate adapted to be moved in the space between the seats, and means for moving the seats and the plate into sealing relation, said means exerting a direct rectilinear thrust within the area of said seats, and said unitary means supporting said sealing means around one conduit end.

KARL F. JUENGLING.